T. C. MOORE.
SKIMMING PROPELLER SKEE.
APPLICATION FILED JULY 5, 1913.

1,086,608.

Patented Feb. 10, 1914.

Witnesses.
E. H. Bankelus
L. Hoffman.

Inventor:
Thomas C. Moore
by James T. Bankelus
his Atty.

UNITED STATES PATENT OFFICE.

THOMAS C. MOORE, OF SAN PEDRO, CALIFORNIA.

SKIMMING-PROPELLER SKEE.

1,086,608.   Specification of Letters Patent.   Patented Feb. 10, 1914.

Application filed July 5, 1913. Serial No. 777,457.

*To all whom it may concern:*

Be it known that I, THOMAS C. MOORE, a citizen of the United States, residing at San Pedro, in the county of Los Angeles, State of California, have invented new and useful Improvements in Skimming-Propeller Skees, of which the following is a specification.

This invention relates to a swimming device adapted for manual propulsion and adapted to enable a swimmer to skim over the surface of the water, aided by a skimming plane which is supported in the water both by skimming action over the water and by a suitable float arrangement.

My invention preferably consists in a skee-shaped board of the general configuration shown in the accompanying drawings, and of such shape as to move through and over the water with a minimum frictional hindrance; the skee having thereon suitable manually operable propelling mechanism and being supported in the water by floats of such configuration and arrangement as to support the skee in position to skim over the surface.

Figure 1:
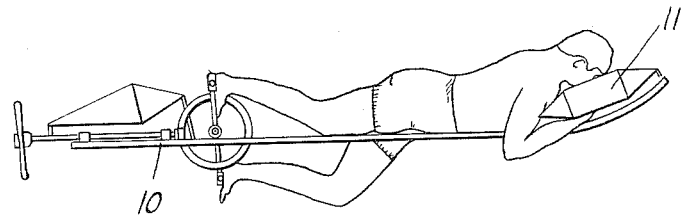
Figure 2:
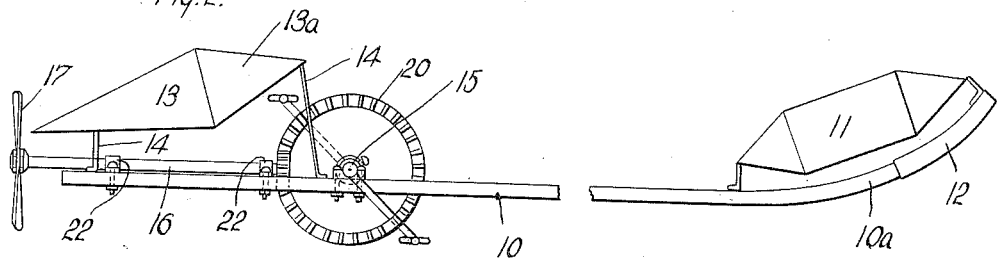
Figure 3:
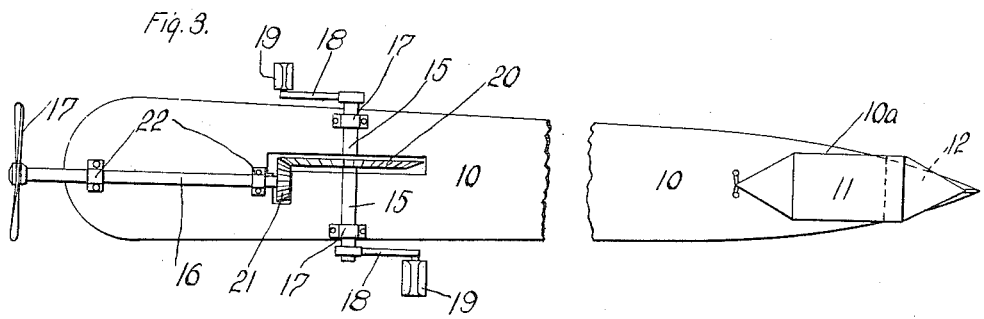

I have shown a preferred form of my device in the accompanying drawings, in which:

Figure 1 is a view showing my device in use. Fig. 2 is a side elevation of the same. Fig. 3 is a plan of the same.

In the drawings the numeral 10 designates a skee-shaped board having an upwardly curved portion 10ª at its forward end which portion is preferably pointed and shaped to afford minimum friction in the water. At the forward end of the skee I preferably mount float 11 in a diagonal position as shown; the float being directly attached to a socket 12 which fits over the forward end of the skee, so as to securely attach the float to the skee and to make it detachable when desired. At the rear end of the skee I place another float 13 attached to the skee through a medium of struts or legs 14 and held in a diagonal position as illustrated. These floats are preferably of the form shown and are placed in their diagonal position so as to afford diagonally upwardly inclined surfaces which greatly aid in the skimming action of my device. When properly constructed and proportioned, the device will skim over the water with the forward end raised upwardly as shown in Fig. 1 and with the lower diagonal surfaces of the rear float 13 acting against the water to aid in the skimming action. The forward end of the float 13 is made conical, as at 13ª, to materially aid in this skimming action at the rear end of the device when the skee is being started and when it is traveling at low speed in the water.

I provide a suitable propeller apparatus, preferably for operation by the feet of the swimmer, consisting of a pedal shaft 15, a propeller shaft 16, a propeller 17, and suitable operating and connecting parts as shown. The pedal shaft 15 is horizontally mounted on the skee in bearings 17 and has at each end, on opposite sides of the skee, cranks 18 with pedals 19 thereon. Gear 20 is mounted upon the shaft 15 to mesh with a small gear 21 upon the propeller shaft 16. The propeller shaft may be suitably mounted in bearings 22 upon the skee and is placed in such an angle that, when the skee is in operative position in the water, as shown in Fig. 1, the propeller will drive the device forwardly and slightly upwardly. The whole arrangement is made so that, with a reasonable speed of pedal action, the propeller 17 will act at full efficiency to drive the device forwardly at maximum speed.

The size and proportions of my device may be varied to suit the needs of individual operators, as regards the weight and strength of the operator. When properly proportioned and operated with a reasonable amount of exertion the device will travel through and over the water in somewhat the position illustrated in Fig. 1 although this position will vary with the speed of travel. Without exhausting exertion I have been enabled, with a device constructed as shown in the drawings, to attain a sustained speed of from eight to ten miles per hour.

Thus it will be seen that my device attains its object through the medium of simple and effective mechanisms, the parts of which are all effective in attaining the desired end. It is to the essentials of this combination that I wish to direct the following claims leaving the details to be varied without departure from the broad spirit of my invention.

Having described a preferred form of my invention, I claim:

1. A device of the character described, comprising in combination a skee-shaped board having an upwardly curved forward end, a supporting float arranged on said board in a diagonally forwardly and upwardly inclined position, and manually operable propulsion means mounted upon said board.

2. A device of the character described, comprising a skee-shaped board having a forward upwardly inclined end, a forwardly upwardly inclined float mounted above the forward end of the board, a forwardly upwardly inclined float mounted upon the rear end of the board, and manually operable propulsion means mounted upon the board.

3. A device of the character described, comprising a skee-shaped board having a forward upwardly inclined end, a forwardly upwardly inclined float mounted over the forward end of the board, said float having a forward conical end, a forwardly upwardly inclined float mounted over the rear end of the board having a forward conical end, and manually operable propulsion means mounted upon the board.

4. A device of the character described, comprising in combination a skee-shaped board having its forward end upwardly curved and pointed, a float mounted over the forward end of the board in a forwardly upwardly inclined position and having a conical forward end, a float mounted over the rear end of the board in a forwardly upwardly inclined position having a forward conical end, a pedal shaft with pedals mounted upon the board, a propeller shaft mounted on the board and rotatively connected with the pedal shaft, and a propeller upon the rear end of the propeller shaft, all substantially as described.

5. A device of the character described, comprising in combination a skee-shaped board having an upwardly curved forward end, a supporting float arranged on said board over its forward end in a diagonally, forwardly and upwardly inclined position, and manually operable propulsion means mounted upon said board.

In witness that I claim the foregoing I have hereunto subscribed my name this 27th day of June, 1913.

THOMAS C. MOORE.

Witnesses:
JAS. H. BALLAGH,
ELWOOD H. BARKELEW.